United States Patent [19]

McCarthy

[11] Patent Number: 4,680,702

[45] Date of Patent: Jul. 14, 1987

[54] MERGE CONTROL APPARATUS FOR A STORE INTO CACHE OF A DATA PROCESSING SYSTEM

[75] Inventor: Daniel M. McCarthy, Glendale, Ariz.

[73] Assignee: Honeywell Information Systems Inc., Phoenix, Ariz.

[21] Appl. No.: 604,769

[22] Filed: Apr. 27, 1984

[51] Int. Cl.[4] .............................................. G06F 12/08
[52] U.S. Cl. ...................................................... 364/200
[58] Field of Search ................ 364/200, 200 MS File, 364/900 MS File

[56] References Cited

U.S. PATENT DOCUMENTS

| | | | |
|---|---|---|---|
| 4,084,234 | 4/1978 | Calle | 364/200 |
| 4,115,855 | 9/1978 | Chiba | 364/200 |
| 4,157,586 | 6/1979 | Gannon | 364/200 |
| 4,217,640 | 8/1980 | Porter et al. | 364/200 |
| 4,287,561 | 9/1981 | Liptay | 364/200 |
| 4,392,201 | 7/1983 | Brown et al. | 364/200 |
| 4,408,275 | 10/1983 | Kubo et al. | 364/200 |
| 4,499,539 | 2/1985 | Vosacek | 364/200 |
| 4,527,238 | 7/1985 | Ryan | 364/200 |

*Primary Examiner*—Archie E. Williams, Jr.
*Assistant Examiner*—Emily Yue Chan
*Attorney, Agent, or Firm*—A. A. Sapelli; J. S. Solakian

[57] ABSTRACT

A register unit includes means for storing pertinent data relative to a plurality of cache transactions, identifying the zones of an addressed word block which is the subject of the individual transactions. These data are selectively extracted from the register to control the merging of the identified zone or zones of the associated word with the remainder of the data in the addressed word block.

8 Claims, 6 Drawing Figures

MERGE CONTROL APPARATUS FOR A STORE INTO CACHE OF A DATA PROCESSING SYSTEM

CROSS REFERENCES

1. Ryan, et al, Ser. No. 470,127, filed 2-28-83, now abandoned.
2. Howell, et al, Ser. No. 511,616, filed 7-7-83
3. Wilhite, et al, Ser. No. 434,196, filed 10-13-82 issued 9/11/84 as U.S. Pat. No. 4,471,432.

BACKGROUND OF THE INVENTION

The present invention relates to electronic and digital computer systems. More particularly, it relates to control elements within the CPU of such computer systems.

As has been noted in the above referenced co-pending application, Ser. No. 470,127 filed 2/28/83 of C. P. Ryan, et al, an aim of improved computer systems is the enhancement of the data throughput of the system. To this end, high speed cache memories have been provided which, in the interest of greater speed of operation, are operated on a store-into basis. That is, data which has been extracted from the main memory and manipulated or modified by the CPU is stored in the cache memory only; the modified data is ordinarily not returned to the main memory except under special circumstances. As also noted in the aforementioned co-pending application, and in co-pending application Ser. No. 511,616 filed 7/7/83 of T. Howell, et al, the computer system may include two or more CPUs operating with the one shared main memory. In such a system, the latest version of a data element may reside only in the cache memory of one of the CPUs. As noted in the aforementioned applications, means are provided for rendering direct access to the data in the cache associated with one CPU by demand from another CPU in the system.

Again, in the interest of enhancing the throughput of data in the computer system, the system is operated in accordance with a pipeline protocol. That is, a series of instructions are applied sequentially to the input of the system in successive cycle time slots of a computer without having to wait for the completion of the previous routine. Thus, with, for example, five time slots in the pipeline, there may be five different instructions simultaneously in successive stages of completion.

In the system set forth in the aforemention co-pending applications, whenever data is transferred into or out of the cache memory, a whole block of data is transmitted. In the exemplary embodiment, each block of data is comprised of eight words of data, while the CPU operates on as much as a double word or on as little as a single byte of an addressed word, the entire block of words including the addressed word is transferred for storage into the associated cache memory. Transfers of data from the CPU to the cache memory require considerably less time, usually, than the transfer of data from the main memory. This requires control of the data flow to assure that modified data is properly merged with the remainder of the block of data extracted from the main memory.

SUMMARY OF THE INVENTION

It is, accordingly, an object of the present invention to provide an improved computer system with enhanced throughput.

It is another object of the present invention to provide, in a computer system as set forth, means for controlling the merging of data from a plurality of sources into a cache memory unit.

In accomplishing these and other objects, there has been provided, in accordance with the present invention, a register unit in which is stored pertinent data relative to a plurality of cache transactions, identifying the zones of an addressed word block which is the subject of the individual transactions. These data are selectively extracted from the register to control the merging of the identified zone or zones of the associated word with the remainder of the data in the addressed word block.

BRIEF DESCRIPTION OF THE DRAWINGS

A better understanding of the present invention may be had from the following detailed description when read in the light of the accompanying drawings, in which.

DETAILED DESCRIPTION

Figure 1:
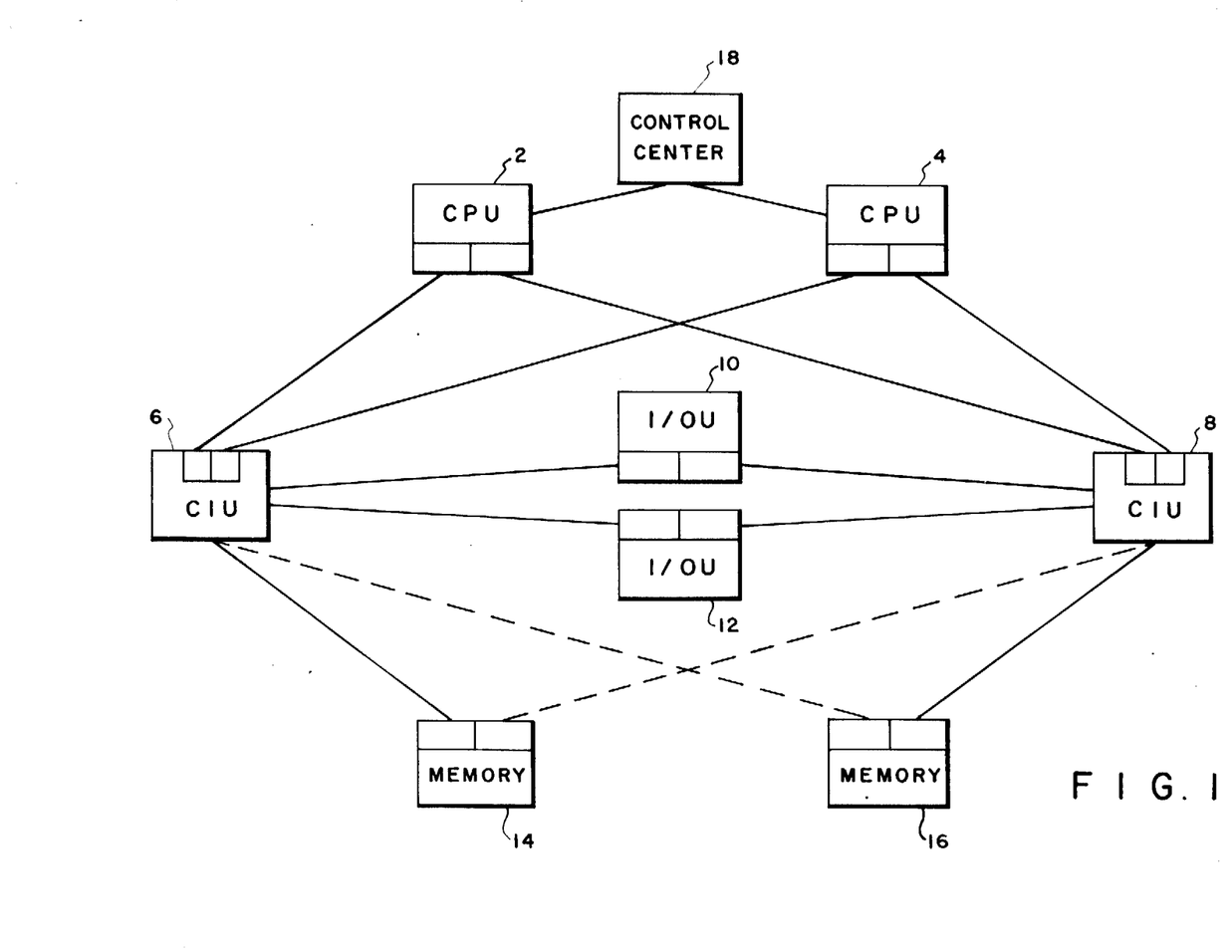
FIG. 1 is a block diagram of a computer system of the type in which the present invention may be embodied.

Referring now to the drawings in more detail, there is shown in FIG. 1 a computer system which includes a first central processing unit (CPU) 2 and a second CPU 4. There is also provided a first central interface unit (CIU) 6 and a second central interface unit (CIU) 8. The first CPU unit 2 has means for communicating with the first CIU 6 and the second CIU 8. Similarly, the second CPU 4 has means for communication with the first CIU 6 and the second CIU 8. One or more input/output units (I/O U) 10 and 12, respectively, are provided. These units basically provide a multiplexed interconnect between the CIUs 6 and 8 and the I/O peripheral units of the system. A first memory unit 14 is connected to be associated with the first CIU 6. Similarly, a second memory unit 16 is connected to be associated with the second CIU 8. In such a system the central processor units 2 and 4 perform their usual computational manipulation of data.

Data is received from or transmitted to the input/output units 10. The central interface units 6 and 8 provide among other things a traffic management function between the central processor unit and the input/output units and the associated memory units.

The memory units 14 and 16 provide a storage place for original data as well as data which has been manipulated by the CPUs. In the system herein set forth, it will be noticed that each of the central interface units 6 and 8 may be in direct communication with either of the two central processor units 2 and 4. Both of the central interface units are in communication with the input/output units 10 and 12. Additionally, in the exemplary embodiment of the present invention, each of the two CIUs has a capability of communicating directly with the memory unit associated with the other half of the system. Thus it may be seen that there is an intercommunication capability between the two halves of the illustrated system.

Because of that intercommunication capability, it is necessary that the several components of the system all be synchronized with respect to each other. To this end, there is provided a control center 18. The control center 18 is, in effect, a further CPU whose function is to define the basic control operations for the system, including the synchronization of the operating units.

The structure illustrated in FIG. 1 is set forth for the purpose of illustrating the environment in which the present system operates.

Figure 2:
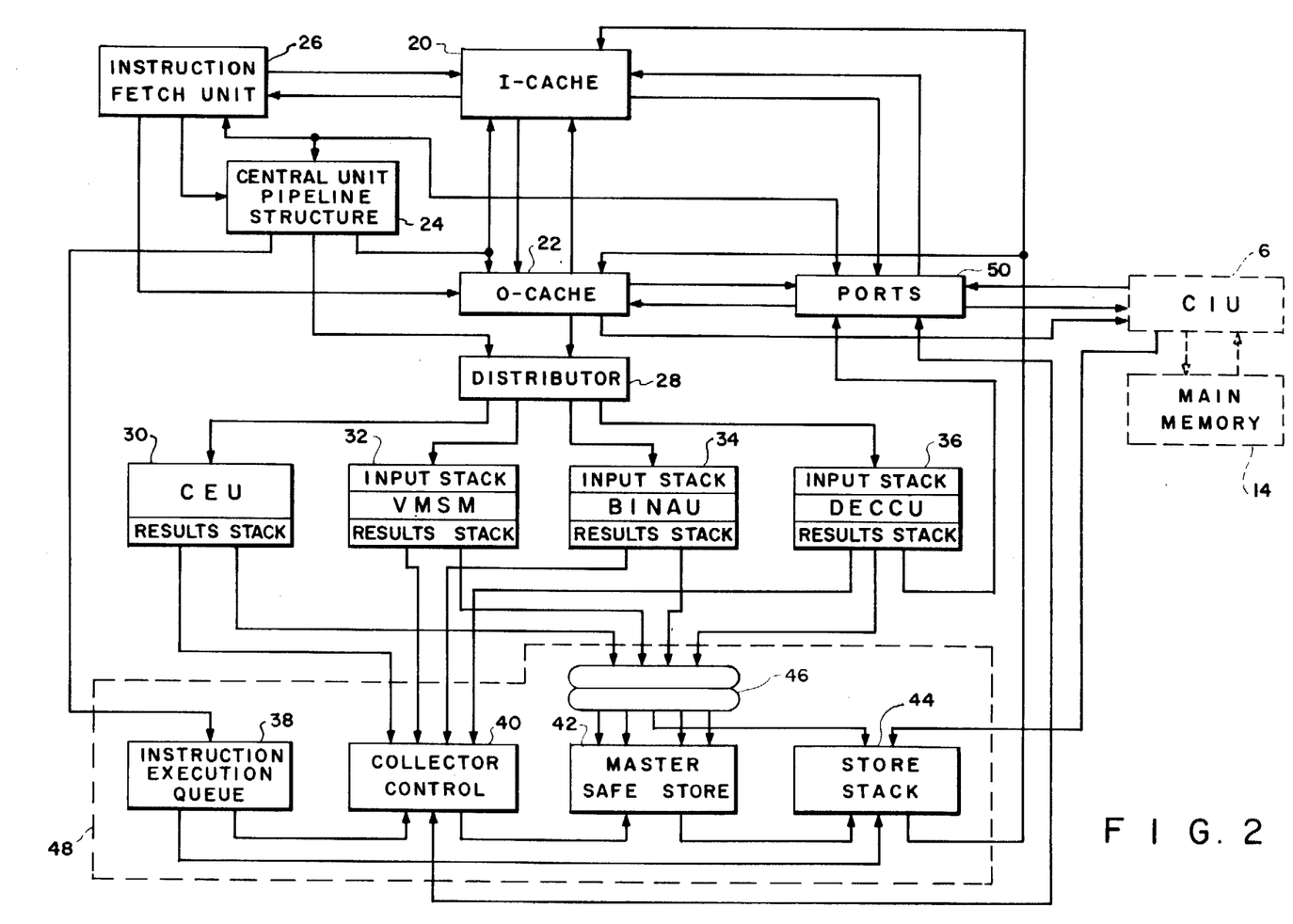
FIG. 2 is a block diagram of a CPU of the type suitable for use in the computer system shown in FIG. 1.

In FIG. 2 there are shown the major components, or subsystems of a CPU such as the CPU 2 shown in FIG. 1; the other CPU 4 is identical in structure. As usual the CPU 2 includes a cache memory. In the exemplary embodiment illustrated in FIG. 2, that cache memory is illustrated as being in two parts or units, one part being an instruction cache 20 hereinafter identified as an I-cache. The other part of the cache memory is illustrated as being an operand cache 22, hereinafter identified as an O-cache. A central unit pipeline structure (CUPS) 24 controls the overall operation of the processor 2. An instruction fetch unit 26 supplies or transmits the address of instruction words to the instruction cache 20 and/or the operand cache 22. In response to the receipt of an instruction address by the instruction cache from the instruction fetch unit 26, an instruction double word is transmitted from the cache 20 or 22 to the instruction fetch unit 26. The instruction fetch unit 26, in turn, stores or accumulates a series of instructions in an instruction stack which is a part of the instruction fetch unit 26.

The central unit pipeline structure (CUPS) 24 obtains the instructions in program order from the instruction stack of the instruction fetch unit 26. The CUPS unit 24 features a five-stage pipeline which, as is more fully described in the aforementioned co-pending application, as well as a co-pending application of Wilhite and Shelly, Ser. No. 434,196, processes the instructions obtained from the instruction fetch unit 26 and effects a decoding of the operation code and the formation of an operand address.

As will be described more fully hereinafter, if the required data is found in a cache memory unit, such data is extracted and applied through a distributor 28 to the appropriate one of several execution units.

In the exemplary embodiment of the computer system, the several execution units include first, a central execution unit 30, the architecture of which is particularly adapted to performing basic computer operations, such as simple moves, adds, subtracts, etc. The central execution unit (CEU) 30 is further characterized in that it executes operations on an as-received basis. A second execution unit is identified as a virtual and security manager unit (VMSM) 32. This unit executes instructions relating to virtual memory, security and special instructions that are peculiar to a secure operating system. A third execution unit is identified as a binary arithmetic unit (BINAU) 34. The architecture of this unit is particularly oriented towards the execution of binary arithmetic instructions such as multiply, divide, and floating point instructions. A fourth execution unit, is, in the exemplary embodiment, identified as a decimal/character execution unit (DECCU) 36. This unit is particularly adapted to the execution of decimal arithmetic alpha-numeric and bit string instructions.

Each of the execution units 32, 34 and 36 is provided with an input stack for the accumulation and sequential issuing of input instructions and data for the respective execution units. Similarly, each of the execution units 30, 32, 34 and 36 is provided with a results stack for the accumulation and sequential issuing of the results of the execution of the respective execution units. An instruction execution queue 38, under control of the central unit pipeline structure 24 stores execution queue words in program order. A collector control unit 40 uses the instruction execution queue words to control the order of reading out of the resultant data in the result stack of each of the execution units 30, 32, 34 and 36. These execution results may, under such control, be stored either in the master safe store 32 or the store stack unit 44 through the operation of a selected switch arrangement 46. The instruction execution queue unit 38, the collector control unit 40, the master safe store 42, the store stack 44, and the selector switch 46 are subcomponents of a unit identified as a collector 48.

All of the foregoing has been premised on the finding of the required data in the cache structure 20 or 22. In the event that the required data is not found in the cache unit, the main memory 14 is accessed through the CIU 6 in order to obtain the required data. The CIU is, in turn, accessed by the cache units 20 or 22 through a ports unit 50. When so obtained the data is stored in the cache structure by the collector. The operation of the CPU then proceeds as herebefore set forth. When the selected data has been acted upon by the appropriate one or more of the execution units, the data is restored to the cache structure by the store stack 44.

Figure 3:
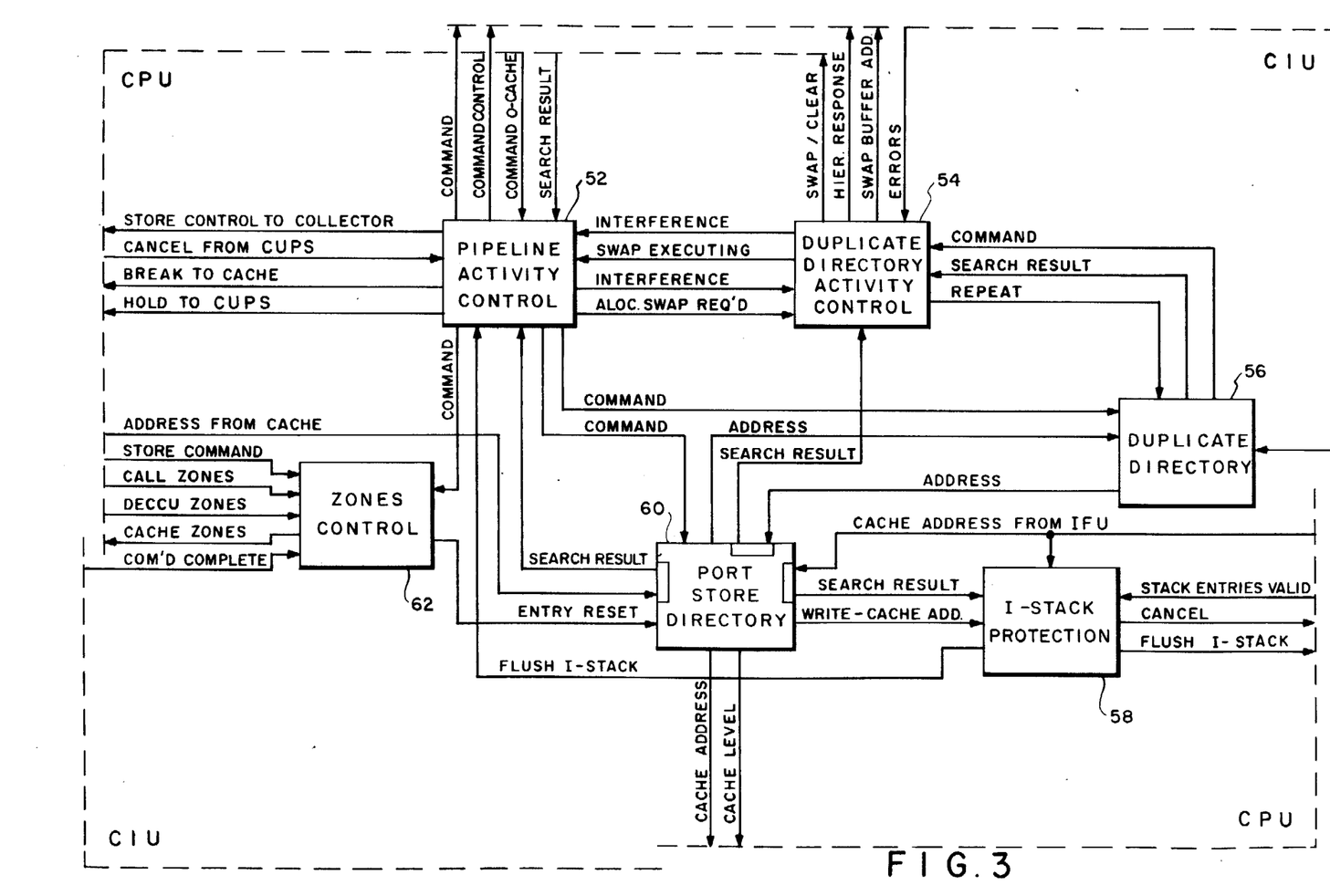
FIG. 3 is a block diagram of the ports component of the structure shown in FIG. 2.

In FIG. 3 there is shown a functional block diagram of the ports unit 50 referenced in FIG. 2. The primary function of the ports unit 50 is to provide interface control between the CPU and the CIU. There are two major sequences that the ports unit provides in order to accomplish the foregoing control. The first of these relates to the pipeline activity of the CPU and its associated cache. Secondly, the ports unit maintains a directory which is a duplicate of the cache directory and is referred to herein as the duplicate directory.

In accomplishing these control functions, the ports unit includes a number of subunit components. A first of these subunit components is identified as a pipeline activity control 52. A second such subcomponent is identified as the duplicate directory activity control 54. Additionally, there is provided a duplicate directory 56, an I-stack protection unit 58, a port store directory 60 and a zones control unit 62. Each of these component units is illustrated as having a number of lines going to and from the units. These lines, rather than indicating physical conductors are representative of the types of signals applied to and received from the component unit. Also, there is a plurality of dashed lines labelled, respectively, CIU and CPU. These lines indicate the major components of the computer system which are not included in the ports unit 50 and with which the port unit components communicate.

The pipeline activity control unit 52 is a logic circuit which provides a principle control interface between the ports unit 50 and the CPU. The pipeline activity control unit 52 receives COMMAND signals from the O-cache. Since on occassion both the O-cache and the I-cache will be searched in the CPU operation, the pipeline activity control unit 52 must also respond to COMMAND signals involving the I-cache. Inasmuch as the search of the I-cache will be simultaneous with the search of the O-cache, the command from the I-cache will be identical to that from the O-cache. There will, however, be included in the command signal from the O-cache a signal indicative that it is either an O-cache only search involved or a dual cache search. Also received from the caches will be a signal indicative of the result of the search in the caches; that is, a HIT or a MISS. The pipeline activity control unit 52 correlates these command and SEARCH RESULTS signals from the CPU with information received from other units, as will be more fully described hereinafter, and provides command and control signals to other components in the ports unit 50 as well as sending command control signals to the associated CIU.

Additionally, the pipeline activity control unit 52 sends control signals to the associated CPU. For example, a STORE control signal is sent to the collector 48 of the CPU as a result of a cache search for a STORE, or WRITE, command. The unit 52 also provides a BREAK control signal for the cache and/or a HOLD control signal to the CUPS unit 24. These later two signals are indicative that in the course of the pipeline operations a succession of procedures are called for which will result in the latter procedures producing erroneous results. Accordingly, the BREAK and/or HOLD signals provide a control to the CPU which temporarily stops the operation of the CUPS unit and/or the cache unit to effect a subsequent retry of the indicated procedures when the interferring operations have been cleared.

The pipeline activity control unit 52 also receives from the CUPS unit a CANCEL signal. This signal is indicative that, in the CUPS unit, an invalid condition has occurred and all signals in the pipeline subsequent to a particular cycle should be cancelled. The CUPS unit will, of course, restart the pipeline.

A duplicate directory activity control unit 54 provides control signals resulting from searches of the duplicate directory 56. In the CPU, each of the cache units 20 and 22 are in the form of a data array and a directory array. As is conventional, the directory array is a record of the address information for data stored in the associated data array. When the cache units are searched, it is the directory that is searched for the address of the data sought. In the ports unit illustrated in FIG. 3, the duplicate directory is, in fact, a duplicate of the directory array of both of the cache units in the CPU. The duplication of the directory in the ports unit allows for a much more rapid access to search information in that the duplicate directory may be searched independently of the directories in the cache units and simultaneously therewith. The duplicate directory receives a command signal from the pipeline activity control unit 52 representing command control relative to the operation of the CPU. The duplicate directory 56 may also receive COMMAND and ADDRESS signals from the CIU relative to transactions originating outside of the associated CPU, for example, from the other of the two CPUs illustrated in FIG. 1.

As illustrated in co-pending application Ser. No. 511,616, filed July 7, 1983, the two CPU's may operate on the basis of a shared memory and may be operating on an identical data block. The CIU provides the hierarchy control for maintaining an orderly transfer of data between CPU's and the main memory. As will also be seen in more detail hereinafter the duplicate directory 56 also receives address information from the port store directory 60. When the duplicate directory has received a command from either the pipeline activity control or the CIU representing a hierarchy control and address signal, a search of the entries in the duplicate directory is made to determine if the addressed block of information is resident in the associated cache memory. The duplicate directory 56 then generates a HIT or MISS signal identified as SEARCH RESULT and transmits that signal to the duplicate directory activity control 54 along with a command signal indicative of the nature and source of the command signal that initiated the search. The duplicate directory activity control unit 54 then correlates the COMMAND and SEARCH RESULT signals from the duplicate directory 56 with the SEARCH RESULT signal from the port store directory 60 and the other signals such as INTERFERENCE and ALLOCATE SWAP REQUESTED signals from the pipeline activity control unit 52 to determine if the indicated transaction may be carried out as a matter of course, or if of there is a conflict involved. Inasmuch as the duplicate directory 56 is used primarily to interrogate the content of the cache for hierarchy requests from the CIU, the duplicate directory activity control unit 54 provides a hierarchy response signal back to the CIU which will be in the nature of a REQUEST DONE signal. Alternatively if data is to be swapped out of the associated cache, then the unit 54 will issue a SWAP signal to the CPU to initiate the swap routine. Simultaneously therewith the unit 54 will send a signal indicative of the SWAP BUFFER ADDRESS to the CIU. As was noted in the aforementioned co-pending application Ser. No. 511,616, the CIU includes a swap buffer as an intermediate storage unit during swap operations. When a swap operation has been indicated, the duplicate directory activity control unit 54 provides a SWAP EXECUTING signal to the pipeline activity control unit 52.

It will sometimes occur that a legitimate transaction will require storage in the cache of a new block of data at an allocated storage address therein, and the data already stored at that address is valid information. Since, in a store into cache arrangement, the only copy of such a valid block of data is the one in the cache, that data must be swapped back to the main memory before the new data can be stored into the cache. Such a requirement would be one of the commands received by the pipeline activity control unit 52 from the O cache. This would, in turn, result in an ALLOCATE SWAP REQUIRED signal from the pipeline activity control unit to the duplicate directory activity control unit 54. The duplicate directory 56 would then initiate the swap routine with the CPU and the CIU while the pipeline activity control unit 52 effects a break in the procedure to the cache to allow the swap operation to be completed first. The pipeline activity control unit 52 and the duplicate directory activity control unit 54 notify each other if there has been an interference detected by either which would prevent a valid execution of the indicated controls. Similarily, the CIU will notify the duplicate directory activity control unit 54 of any errors in the data or procedure which it has detected and which would necessitate interrupting the on-going procedures. If such ERRORS or INTERFERENCE indication has been received by the duplicate directory activity control unit 54, the unit 54 will indicate to the duplicate directory 56 that the search command should be repeated. On the repeat search, the interferring condition should have been alleviated.

In the I-fetch unit 26 of FIG. 2, there is an instruction stack wherein there is stored instructions which have been prefetched from the cache units 20 and 22. Between the time that the instructions are prefetched from the cache units and stored in the instruction stack, and they are called forth and used by the CPU, there may have been changes in the requested information as a result of an intervening activity of the CPU. On the other hand, the instruction fetched from the cache may relate to information which is already in the pipeline procedure. In either case, it is possible for the continuation of the process with those instructions lodged in the instruction stack for the computer system to provide erroneous transactions.

To avoid such an occurrence, there is provided the I-stack protection unit 58. In the I-stack protection unit 58, there is a register for each location in the I-stack. The cache address from the I-fetch unit is compared, as will be seen with the discussion of the port store directory 16, to determine if an interferring activity exists which would invalidate the proposed activity with respect to the questioned instruction. If such an interferring activity is detected, the I-stack protection unit 58 will transmit, depending upon the nature of the interferring activity, a cancel signal to the I-fetch unit to cancel the selected entry in the I-fetch unit. Alternatively, if the cache had received a WRITE command to store data to a given address in the cache, that address is also communicated to the I-stack protection unit for comparison with the content of the I-stack. If a HIT is encountered, the I-stack protection unit 58 will transmit a FLUSH I-STACK signal to the I-fetch unit, to clear out all instructions subsequent to the one on which the HIT was encountered. The FLUSH I-STACK signal is also transmitted to the pipeline activity control unit 52 which in turn transmits a HOLD signal to the CUPS unit to hold up the operation thereof until the I-stack can be flushed.

The port store directory 60, as shown in more detail and claimed in a copending application filed on even date herewith includes primarily a register for address information for each item that has been entered in the pipeline for processing and which process has not yet been completed. The port store directory 60 receives address information directly from the cache and it receives a command signal from the pipeline activity control unit 52. Under control of the command signal from the pipeline activity control unit 52, the port store directory stores the address information in the suitable location within the port store directory. In an exemplary embodiment, the port store directory register comprises a four-by-four entry array. That is, there were four levels with each level containing four sets. Each entry, in the exemplary embodiment, comprised a 40-bit word which includes 16 bits of the real memory address, an 11-bit cache address, a 1-bit cache identifier (which identifies whether the address is in the O-cache or the I-cache), a 2-bit cache level signal (to indicate which level of the cache the address represents), a 2-bit swap identification signal (which indicates the address in the swap buffer if a swap is indicated), and eight operational flags that indicate what operation has been called for in connection with that address. The 16 entries in the port store directory register should be adequate to accommodate all finished operations scheduled in the pipeline.

Whenever an operational entry is made into the pipeline of the CUPS unit 24 (FIG. 2), the address associated therewith is transmitted to the port store directory 60 and the command from the pipeline activity control unit 52 indicates that the register of the port store directory 60 should be searched to determine if there is another unfinished operation in the pipeline which refers to the same address. If, after such comparison, no identical address is found in the port store directory, then the current operation proceeds, creating a new port store directory entry. If, on the other hand, there should be found in the port store directory another entry directed to the same address as the one in question, that HIT would be evaluated to determine if the new entry would be compatible with the former entry or would be in conflict therewith. If no conflict would result, the current operation proceeds, creating a new port store directory entry, if needed. If, on the other hand, a conflict would result, then a control signal is sent to the CPU to provide the necessary corrective action to avoid the conflict which would cause erroneous data being entered into the computer system.

It will be recalled that address information from the I-fetch unit 26 (FIG. 2) is applied to the input of the I-stack protection unit 58. The same address information is applied to an input of the port store directory 60. That address is also compared with the cache address information already lodged in the port store directory 60. If the same address is not found in the port store directory, the port store directory sends as a search result a MISS signal to the I-stack protection unit 58. If, on the other hand, the same address is found, the HIT, is evaluated to determine if the HIT would result in a conflict which would, in turn, produce erroneous results in the computer system. If such a conflict would result, then the SEARCH RESULT signal transmitted to the I-stack protection unit 58 would so indicate and the I-stack protection unit 58 would then transmit its FLUSH I-STACK signal.

Similary, when signals are received from the CIU through the hierarchy structure to the duplicate directory 56, indicating a command and an address from the CIU, the address is compared with the addresses already stored in the duplicate directory to determine if that block of data is already stored in the cache memory. Further, the duplicate directory 56 transmits the address to the port store directory to determine if that address is the same as an address currently in the pipeline but as yet unfinished. The search results of that address are transmitted via the port store directory 60 to the duplicate directory activity control 54. If the address is not found in the port store directory, then a MISS is transmitted as a search result. If a HIT is encountered, the HIT is evaluated to determine if the continuation of the process would produce a conflicting invalid result. If so, the appropriate instruction is issued through the duplicate directory activity control 54 either, to repeat the request from the duplicate directory 56 after the conflict has been resolved, or an INTERFERENCE signal is transmitted to the pipeline activity control unit 52 to take corrective action in the CPU or the CIU as required.

Another function of the port store directory 60 is to store the address and control information for a CPU activity while the CPU is in the process of manipulating the selected data. When the CPU has completed its manipulation of the data, the result of that manipulation is stored in the collector 48 of the CPU. When the data in the collector is to be returned to the cache for storage, the command is issued to the port store directory which issues the cache address and the cache level into which the data in the collector is to be stored. At the same time, when the data from the collector is stored into the cache, the port store directory 60 also transmits the address of such data to the duplicate directory 56. Thus the duplicate directory 56 may maintain its identity with the directory of the cache into which the data was stored.

When the command to the port store directory 60 includes a WRITE into the cache memory, the cache address is also transmitted to the I-stack protection unit 58. The I-stack protection unit 58 effects the comparison with the data stored therein to determine if there is in the I-stack an instruction that would tend to conflict with the current WRITE instruction. If such a conflict exists, the I-stack protection unit then issues the control signals to the pipeline activity control unit and to the I-fetch unit to effect the necessary remedial action In the exemplary embodiment, data is transferred from the main memory to the cache memory in blocks of eight words. Each cache address location is the location of a double-word, or two words, out of the eight word block. Thus, each address stored in the port store directory 60 represents the address of a double-word. The operation of the CPU may involve substantially less than the entire double-word. In fact, it may involve as little as one or more bytes of one of the words of the double-word. In the course of events, the eight word block embodying that address may be called from the main memory or transferred from the cache of another memory. It is characteristic of the CPU in such a computer system that it does not wait for the entire eight word block to be transferred into cache before it effects its manipulation of the data at hand.

Since the transfer of data from the main memory is a very slow process, relatively, it is possible for the manipulated data from the CPU to be entered into the cache before the data from the main memory has been lodged therein. If that were to happen, then the manipulated data stored into the cache by the CPU would be overwritten by the old data from the main memory and the manipulated or new data would thereby be lost. To prevent such a loss, the zones control unit 62 stores a set of zone control signals or zone control bits for each entry in the port store directory 60. Each address in the port store directory has linked to it the zone data bits of four double-words having the same block address. Each word is formed of four bytes or zones. Thus, each double word would include eight zones or bytes. Each zone of the double word is represented by a one bit signal stored in positional relationship in the zones control unit.

As shown in FIG. 3, the zones control unit receives a store command from the CPU indicating that the CPU is instructed to effect a store operation into a given address in the cache. CPU stores to cache commands, or instructions, are performed, or executed, on a double-word basis, two data words at a time. The zones control unit 62 receives the specific zone signals from the collector 48 of the CPU or directly from the DECCU unit 36 of the CPU. The zone control signals indicate which of the zones or bytes of the double word are reserved for manipulation by the CPU. These signals comprise an inhibit signal for those zones for the entry of data from any source other than the CPU. When the transaction has been completed, a COMMAND COMPLETE signal will be received from the CIU whereupon the zones control unit will clear that entry from its stack. The same signal will result in an ENTRY RESET signal being transmitted to the port store directory 60. This ENTRY RESET signal has the effect of resetting the appropriate flag signal which is part of the data stored in the port store directory associated with the particular entry.

Figure 4:
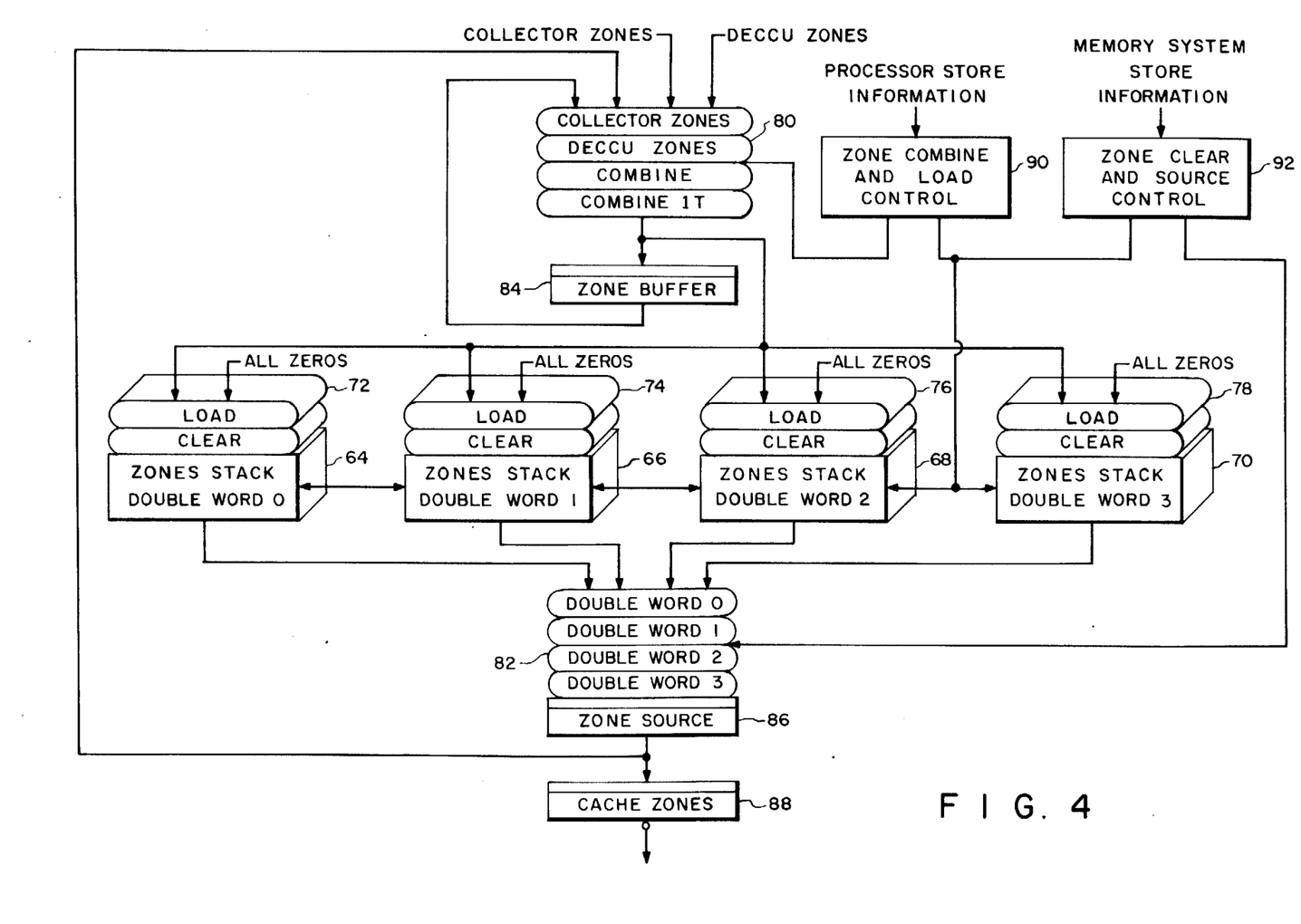
FIG. 4 is a block diagram of a zones control component of the ports unit shown in FIG. 3.
Figure 5:
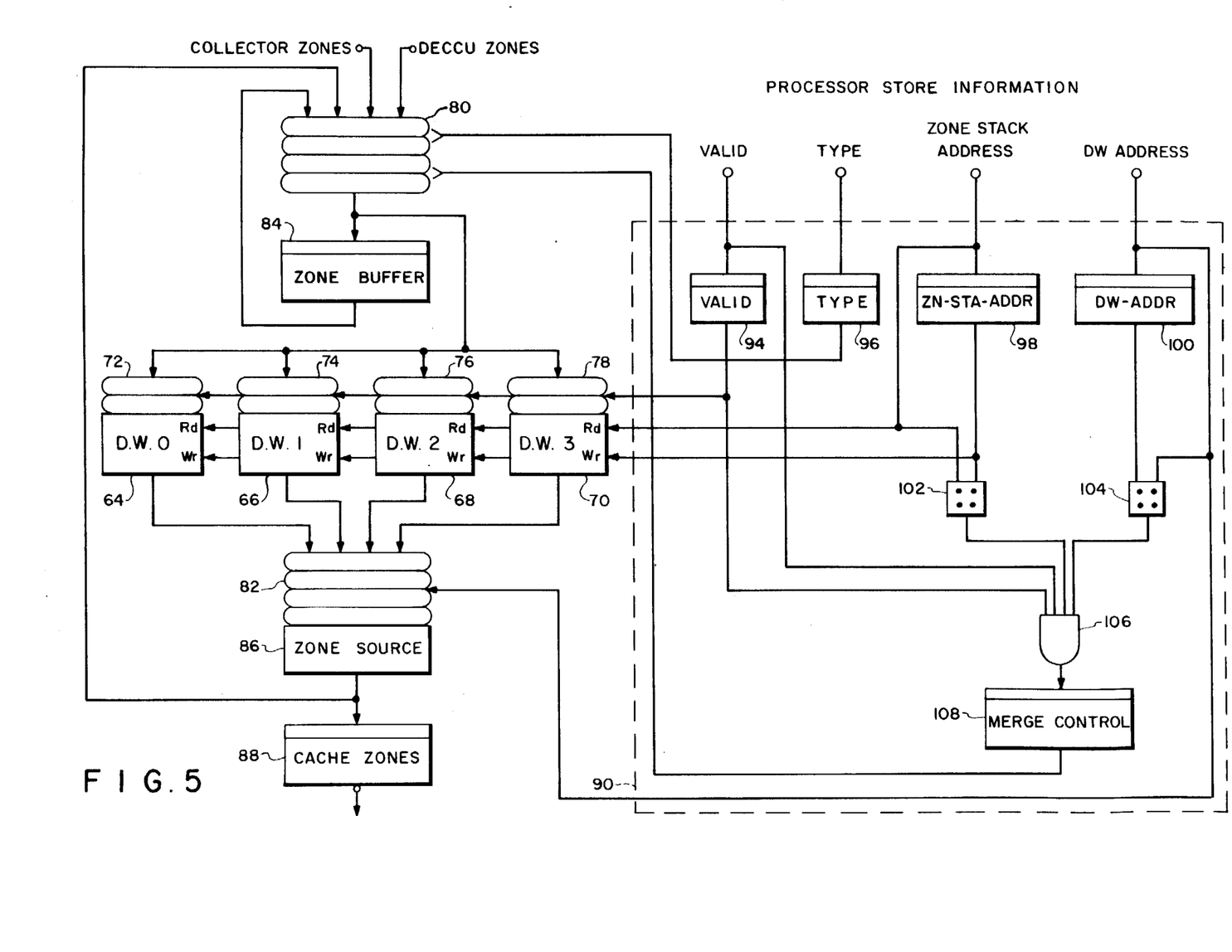
FIGS. 5 and 6 are block diagrams illustrating greater details of certain features of the zones control element shown in FIG. 4.
Figure 6:
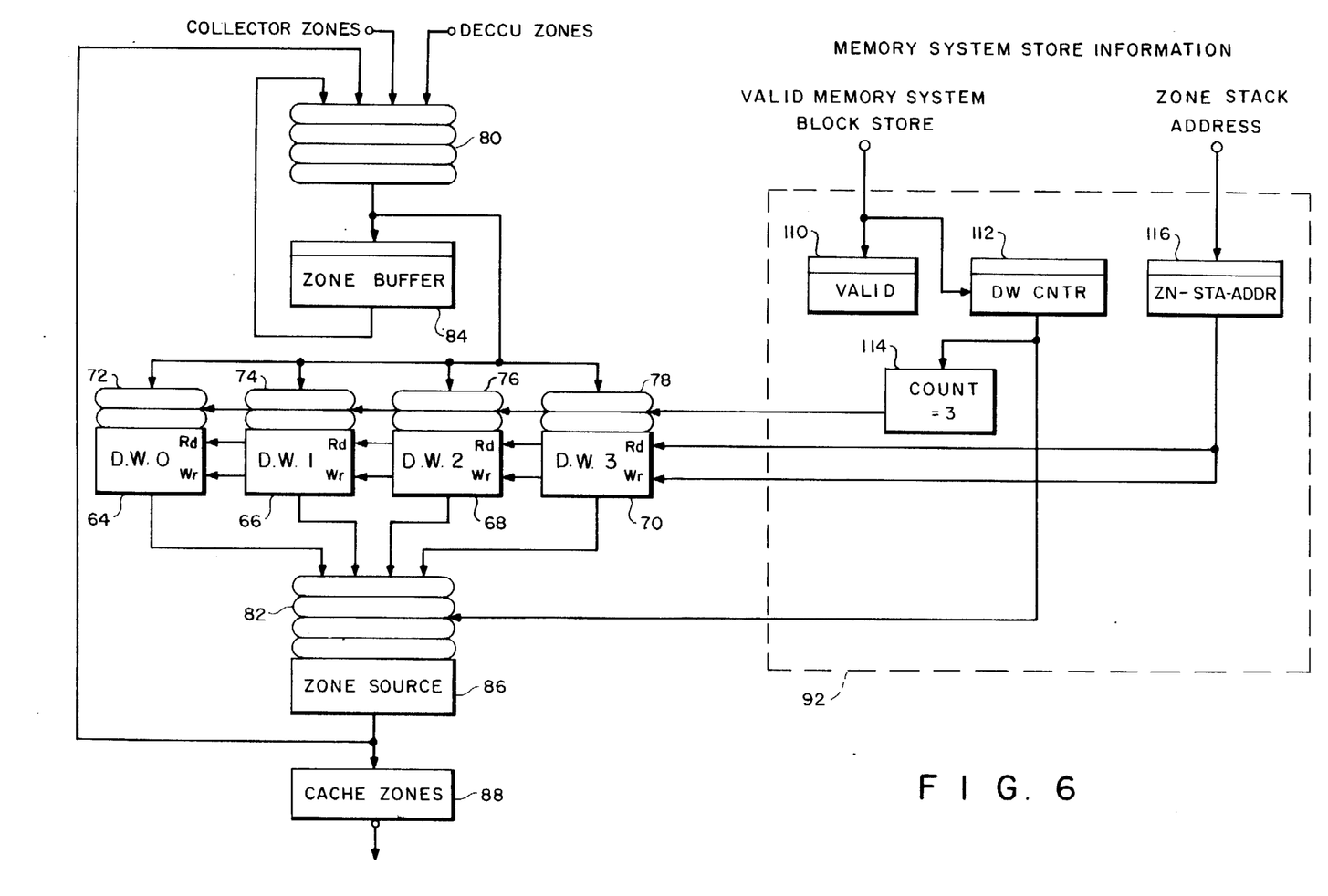

The zones control unit 62 of the ports assembly shown in FIG. 3 is shown in greater detail in FIGS. 4, 5 and 6. Specifically, as shown in FIG. 4, the zones control unit includes a first zones stack 64 which represents Double Words 0, a second zones stack 66 which represents Double Words 1, a third zones stack 68 represents Double-Words 2 and a fourth zones stack 70 represents Double-Words 3. Each of the zones stack units 64, 66, 68 and 70 has a sixteen-entry register with each entry including a capability for recording the zones control indicia for a double-word. In the exemplary embodiment, each word includes four bytes, or zones. Accoringly, each entry in the zones stack includes an eight-bit word with each bit being positionally representative of the byte, or zone, of the associated double word. Thus, as stated, in the exemplary embodiment, the eight word block of data which is addressed to the associated cache memory, is represented by the double-word control signals in each of the four zone stacks 64, 66, 68 and 70.

The input to the zones stack 64 is accomplished through a selector 72. The selector 72 is a two-input selector in which one input comprises the zones control signals for actively loading the appropriate zone control signals into the zones stack register 64. The other input is in the nature of all logical zeroes which may be selectively actuated to clear an associated entry in the zones stack register 64. A similar selector 74 is connected to the input of the zones stack register 66. In a similar manner, a selector 76 and a selector 78 are coupled to the input, respectively, of the zones stack 68 and 70.

The input of signals to the selectors 72, 74, 76 and 78, and hence to the associated zones stack 64, 66, 68 and 70, is accomplished through a four-layer selector 80. The first layer of the selector 80 is indicated as being the input register for zones control signals received from the collector 48 of the associated CPU. The second layer of the selector 80 is indicated as being the receiver of zones control signals from the DECCU unit 36 of the associated CPU. The third segment of the selector 80 is labelled COMBINE, in FIG. 4, and accommodates the outputs from an output selector 82, to be discussed hereinafter. The fourth segment of the selector 80 is labelled COMBINE IT. This segment is arranged to accommodate the output signal from a zone buffer 84 connected directly to the output of the selector 80. The output of the selector 80 is also connected to the LOAD input of the selectors 72, 74, 76 and 78.

The output of each of the zones stack units 64, 66, 68 and 70 is applied to the corresponding selector level of the selector 82. Thus, the Double-Word 0, Double-Word 1, Double Word 2 or Double Word 3 may be individually selected. The selected double word from the selector 82 is applied to a zone source buffer 86. It is the output of that zone source buffer 86 which is applied to the COMBINE input of the selector 80. The output of the zone source 86 is also applied to the cache zones buffer 88 for actually controlling the enabling of the indicated address in the designated cache.

The operation of the zones control unit is effected through the operation of two control elements, the first a Zone Combine and Load control element 90 and a Zone Clear and Source control element 92. These elements are shown in more detail in FIGS. 5 and 6, respectively. As noted in FIG. 5, the Zone COMBINE and Load control element 90 receives processor store information from the associated CPU. These include a VALID signal to indicate that the forthcoming zone signals are indeed a valid representation, a TYPE signal to indicate whether or not the signals are being received from the collector unit or from the DECCU unit. A ZONES STACK ADDRESS signal is also received which identifies which of the 16 entries in each of the zone stacks 64–70 is to be addressed. There is also received a DOUBLE-WORD ADDRESS signal to identify which of the four stacks is to be addressed. These signals are applied to and stored in associated registers. Thus, the VALID signal is stored in a VALID register 94, the TYPE signal is stored in the TYPE register 96, the ZONE STACK ADDRESS is stored in the similarly identified register 98 and the DOUBLE-WORD ADDRESS signal is stored in its appropriately identified register 100.

The processor store information is received by the control element 90 one computer clock cycle before the zones signal, themselves, are delivered to the input of the selector 80. The TYPE signal in the register 96 is applied during the following clock signal to select between the COLLECTOR zones input and the DECCU zones input, the first two selector segments of the selector 80. The current STACK ADDRESS SIGNAL is compared in a comparator 102 with the stack address signal from the previous cycle stored in the register 98, to determine whether or not there are back-to-back, or two sequential, store instructions for the same block of data identified in the stack address. Similarly, the current DOUBLE-WORD ADDRESS is compared with the DOUBLE-WORD ADDRESS of the previous cycle from the register 100. If the current STACK ADDRESS SIGNAL is identical to the previous STACK ADDRESS SIGNAL and the DOUBLE-WORD ADDRESS word address is identical to the previous DOUBLE-WORD ADDRESS, word address, the output of the comparators 102 and 104 are applied as input signals to an AND gate 106. If both of the current and previous signals were valid as indicated by the current VALID signal and the previous VALID signal from the register 94, also being applied to corresponding inputs to the AND gate 106, an output signal from the AND gate 106 will establish a control status in the merge control register 108. If the two signals are not identical, then the control condition established in the merge control register 108 is different. Specifically, if the comparators 102 and 104 indicate a mismatch, that is, there were not back-to-back instructions for the same double word, then the proper source for the merge signal will be the zones signals located in the zones source buffer 86 which is fed back to the input of the selector 80 and lodged in the layer designated COMBINE. On the other hand, if there had been back-to-back store instructions to the same data word, the proper word would be found in the zones buffer 84. That signal has been fed back to the input of the selector 80 and lodged in the layer designated COMBINE IT.

The valid signal from the buffer 94 is applied to the input selectors 72, 74, 76 and 78 to enable those selectors when the applied signal is, indeed, valid. The current zones stack address signal, in addition to being applied to the zones stack address buffer 98 is also applied to the READ input of the double-word stacks 64, 66, 68 and 70. The output of the zones stack address 98 is similarly applied to the write control input of the double word stacks 64, 66, 68 and 70. In like manner, the double-word address, in addition to being applied to the input of the double-word address buffer 100 is also applied to control the output of the selector 82.

In FIG. 6, there is illustrated in greater detail the zone clear and source control element 92. Again, there is a VALID signal to indicate the validity of the memory system block store indication. That VALID signal is lodged in a VALID signal buffer 110 to be used for purposes not forming a part of the present invention. The VALID signal is also applied as an input signal to a double-word counter 112. The output of the counter is applied as a control signal for the selector 82 at the output of the zones stacks. The output of the double word counter 112 is also applied as an input signal to a count-equals-three summing circuit 114. The output of the circuit 114 is applied as a control signal to the selectors 72, 74, 76 and 78 at the input, respectively, of the double word stacks 64, 66, 68 and 70. A ZONES STACK ADDRESS buffer 116 receives the ZONES STACK ADDRESS information from the CIU and, at the proper time, applies the control signals to the READ or WRITE input control of the double word stacks 64, 66, 68 and 76.

As hereinbefore noted, the processor store information is received by the Zone Combine and Load control unit 90 one clock time before the zones information, itself is received by the input selector 80. During that first clock time cycle, the current ZONE STACK ADDRESS signal is used to read out the zone information stored at the addressed location in the four double-word stacks 64, 66, 68, 70. These data are read into the associated segment of the output selector 82. The current DOUBLE-WORD ADDRESS signal effects the selection of the proper double-word by the selector 82 for deposit into the buffer 86. That selected data from the zone source buffer 86 is wrapped around and reinserted in the selector 80 in the segment labelled COMBINE.

The zones data from the previus clock cycle, which was held in the zone buffer 84, is, during the current cycle, also wrapped around and reinserted into the selector 80 in the segment labelled COMBINE IT.

The ZONE STACK ADDRESS signal of the current clock cycle is compared with the ZONE STACK ADDRESS signal of the previous cycle, and the DOUBLE-WORD ADDRESS signal of the current cycle is compared with the DOUBLE-WORD ADDRESS of the previous cycle, as noted hereinbefore, to determine whether or not there have been two successive, or back-to-back, instructions addressed to the same double-word. The result of these comparisons is used to control, through the register 108, the selection, on the next clock cycle, between the segment labelled COMBINE or the segment labelled COMBINE-IT of the selector 80. If there are no back-to-back store instructions to the same double-word address the register 108 is conditioned to affect the selection of the double-word zones data through the COMBINE segment of the selector 80. If, on the other hand, there are back-to-back, or successive store instructions to the same double-word, the register 108 is conditioned to effect the selection of the double-word zones data through the COMBINE IT segment of the selector 80.

On the next clock cycle, the zones data are presented to the selector 80 from either the COLLECTOR 48 of the CPU or from the DECCU 36 of the CPU. These are presented, repectively, through the correspondingly identified segments of the selector 80. The TYPE signal from the buffer 96 effects the selection as between these two segments of the selector 80. The output of the selector 80 is then the bit-wise OR of the signals passed through selected segments of the selector 80. That output is then written ito the designated address of the selected double-word stack.

In this manner the zones control unit may accumulate zone control bits for a plurality of instructions involving a given data block during the interval between the initial procedure which initiated the transfer of a block of data into the cache and the completion of that transfer.

When a block of data is to be transferred from the memory system to the cache of the subject CPU, the entire eight word block is extracted from the main memory (or the chache of a communicating CPU) in double-word increments, always in numerical sequence. As the memory system store information is introduced, a VALID signal is applied to the input of the DOUBLE-WORD counter 112, resetting that counter to zero. The memory systems store informations includes ZONE STACK ADDRESS signal which is loaded into the register 116. On the next clock cycle, the ZONE STACK ADDRESS signal is applied to the READ control input of the double-word stacks 64, 66, 68 and 70, outputting the zones data therein to the corresponding segments of the selector 82. At the same time, the DOUBLE-WORD COUNTER 112 begins to step through the four double-words of the block beginning with Double-Word 0. The output of the counter 112 causes the sequential application of the four double-words, through the zone source buffer 86 to the cache zones buffer 88. When the CPU operates on an instruction that requires the modification of a data word and that instruction includes the transfer of a block of data from the memory system, the zone control signals are generated and deposited in the double-word stacks of the Zones Control Unit to indicate which zones and which words of the block are to be acted upon. In the exemplary embodiment of the present invention, the zone control signals appear as a logical "1" in the protected zone or byte position of the designated double-words in the zones control stacks while a logical "1" appears at all other zone or byte positions of the double-words of the data block. As each double-word of the data block is presented from the memory system for loading into the cache, the zones control signals of the corresponding double-bit word are issued from the buffer 88, inverted and applied to selectively enable or disable the corresponding byte or zone position at the addressed cache location. Thus, only the CPU can write into the protected zones or bytes of addressed cache location. If it happens that the CPU store to cache operation has been completed before the block of data from the memory system has been stored in the cache, then the new data from the CPU cannot be overwritten and destroyed by the later storage of the block of data.

When the fourth stack, Double-Word 3 stack, has been addressed, the Count=3 register causes the selectors 72, 74, 76 and 78 to load all zeroes into the addressed location of the associated ones of the Double-Word Stacks 64, 66, 68 and 70, the ZONE STACK ADDRESS signal now being connected to activate the WRITE control of stacks. This effectively clears the addressed location of the Double-Word stacks to ready them for the next block of data whose zones information is to be stored therein.

Thus there has been provided a computer system with enhanced throughput, which includes means for controlling the merging of data from a plurality of sources into a cache memory unit while preserving the integrity of the stored data.

I claim:

1. A computer system comprising:

A central processor unit, CPU, having at least one execution unit means for executing instructions and producing processor data words, a store into cache for storing data words, means for issuing store into cache commands, and CPU circuit means interconnecting the execution unit means, the store into cache, and the means for issuing store into cache commands, the receipt of a store into cache command by the cache causing the cache to store at least one zone of data bits from a pair of processor data words produced by the execution unit means, each data word consisting of a predetermined number of bits which number is a multiple of the number of bits in a zone; and hierarchical memory system means operatively connected to the CPU for storing in and reading out of said memory system means blocks of system data words at locations of the memory system means having addresses, each block of system data words having a block address, a block address being the address of a block of addressable locations of the memory system means;

said execution unit means producing as the result of the execution of an instruction at least one zone of processor data in a pair of processor data words for storage in the store into cache;

means connected to the CPU circuit means for producing zone control bits having a predetermined binary value to identify the zones of each pair of processor data words containing processor data produced by said execution unit means for storage in the store into cache;

means connected to the CPU circuit means for producing the block address of each pair of processor data words produced by the execution unit means for storage in the store into cache;

said store into cache, in response to the receipt by the cache of a store into cache command, of a pair of processor data words, of a block address of the pair of processor data words, and of the zone control bits for said pair of processor data words, storing in said cache the bits of the zones of the processor data words containing processor data identified by zone control bits having said predetermined binary value said bits of the zones of the processor data words being stored in locations corresponding to the block address of said pair of processor data words;

register means connected to the CPU circuit means for storing the zone control bits produced by the means for producing zone control bits;

means operatively connected to the register means for extracting the zone control bits from the register means upon the receipt of a store to cache command for a block of system data words having the same block address as that of processor data words previously stored in the store into cache, said zone control bits having said predetermined binary value identifying the zones of the data words stored in the cache containing processor data; and means operatively connected to the means for extracting zone control bits and responsive to the zone control bits having said predetermined binary value for inhibiting the cache from storing corresponding zones of system data words of a block of system data words read out of hierarchical memory system means and transmitted from the hierarchical memory system means to the CPU.

2. A computer system as defined in claim 1 in which a data word consists of thirty-six bits, and a zone of nine bits.

3. A computer system as defined in claim 2 in which a block of data words consists of eight data words.

4. A computer system comprising:
a random access memory subsystem means for storing system data words organized into blocks of data words, with each block of system data words having a block address; and
a central processor unit, CPU, said CPU being operatively connected to the memory subsystem means for receiving blocks of system data words read out of the memory subsystem means, said CPU having a plurality of execution unit means, store into cache means, collector unit means, and CPU circuit means for interconnecting the execution unit means, the cache means, and the collector unit means, the store into cache means including a directory array and a data array, the directory array storing the block address of data words stored in the data array;
said execution unit means executing instructions to produce two processor data words with each data word being divided into a plurality of zones;
said collector unit means issuing to the store into cache means, a store into cache command, two processor data words produced by an execution unit means, the block address of the two processor data words in the random access memory subsystem, and zone control bits, zone control bits having a predetermined binary value identifying the zones of said processor data words which contain valid processor data;
port means operatively connected to the CPU circuit means and the memory subsystem means, said port means including a duplicate directory of the directory of the store into cache means, said port means on receiving from the collector unit means a store into cache command, the block address, and the zone control bits of two processor data words, for searching the duplicate directory to determine if the block address of the two processor data words is stored in the duplicate directory, and for issuing a read command and the block address of the processor data word to the random access memory subsystem means if such block address is not stored in the duplicate directory, said port means including merge control means;
said store into cache means on receiving a store into cache command, two processor data words, the block address of the two data processor words and the zone control bits for said two data processor words from the collector unit means for storing the data of the zones of the processor data words the zone control bits of which have said predetermined binary value;
said merge control means including register means for storing zone control bits received from the collector unit means, and means for extracting the zone contol bits from said merge control means for a block of system data words from the random access memory subsystem having the same block address as that of a block of processor data words stored in the store into cache means and means controlled by the binary value of the zone control bits so extracted having said predetermined binary value for preventing corresponding zones of system data words of the block of system data words from being stored in the store into cache means.

5. A computer system comprising:
a hierarchical memory subsystem means for reading out of said memory system means blocks of system data words stored at addressable locations of memory subsystem means, each block of system data words having a block address, each of said data words consisting of a predetermined number of bits organized into a plurality of zones; and
a central processor unit, CPU, having a store into cache, at least one execution unit, said execution unit producing as a result of the execution of an instruction at least one zone of processor data in a pair of processor data words for storage in the store into cache; means for producing zone control bits having a given binary value to identify the zones of each pair of processor data words containing processor data; means for producing the block address of each pair of processor data words produced by the CPU for storage in the store into cache, said block address being an address of a block of data words in the hierarchical memory subsystem means; means for issuing store into cache commands; and CPU circuit means for interconnecting, the means for issuing store into cache commands, the means for producing a block address, the means for producing zone control bits, the execution unit, and the store into cache;
said store into cache in response to the receipt of a store into cache command, of a pair of processor data words, of the zone control bits and the block address for said pair of processor data words, storing in said cache the bits of the zones of each pair of processor data words the zone control bits of which have said given binary value;
port means operatively connected to the CPU circuit means and the hierarchical memory subsystem, said port means including register means for storing the zone control bits produced by the means for producing zone control bits for the processor data words of a block of data words stored in the store into cache;
means for extracting from said register means the zone control bits of processor data words stored in the store into cache having a given block address upon the receipt by the CPU of a store to cache command and system data words of a block of system data words from the hierarchical memory subsystem for storage in the store into cache having said given block address; and
means responsive to the zone control bits so extracted and having said given binary value for inhibiting zones of the data bits of the system data words from being stored into the store into cache.

6. A computer system as defined in claim 5 in which the means for issuing store to cache commands is a collector unit of the CPU.

7. A computer system as defined in claim 6 in which the collector is also a producer of zone data bits.

8. A computer system as defined in claim 7 in which the port means further includes means for storing the zone bits for two pairs of processor data words having the same block address issued by the collector means sequentially without interrupting operation of the store into cache.

* * * * *

ND STATES PATENT AND TRADEMARK OFFICE

CERTIFICATE OF CORRECTION

PATENT NO. : 4,680,702
DATED : July 14, 1987
INVENTOR(S) : Daniel M. McCarthy

Page 1 of 2

It is certified that error appears in the above—identified patent and that said Letters Patent is hereby corrected as shown below:

ABSTRACT: Line 1 delete "includes means for storing" and insert therefor --stores--

Line 2 delete "identifying" and insert therefor --identifies--

Column 2, line 32, "DETAILED DESCRIPTION" with --DESCRIPTION OF THE PREFERRED EMBODIMENT--

Col. 10, line 19, delete "Accoringly" and insert therefor --Accordingly--.

Col. 13, line 44, delete "1" and insert therefor --0--.

Claim 1 (Col. 14, line 53) after "value" insert --,--.

Claim 4 (Col. 15, line 49) delete "for issuing" and insert therefor --if such a block address is not stored in the duplicate directory, to issue--.

Claim 4 (Col 15, lines 52-53) delete "if such block address is not stored in the duplicate directory"

Claim 4 (Col 15, line 59) insert --,-- between "words" and "the zone"

Claim 4 (Col 15, line 60) delete "of which have" and insert therefor --having--.

Claim 4 (Col 16, line 3) delete "so extracted"

UNITED STATES PATENT AND TRADEMARK OFFICE
CERTIFICATE OF CORRECTION

PATENT NO. : 4,680,702

DATED : July 14, 1987

INVENTOR(S) : Daniel M. McCarthy

It is certified that error appears in the above—identified patent and that said Letters Patent is hereby corrected as shown below:

Claim 5 (Col 16, line 9) delete "out of said memory system means"

Claim 5 (Col 16, line 10) before "memory" insert --the--

Claim 5 (Col 16, lines 54 & 55) delete "so extracted and"

Signed and Sealed this

First Day of March, 1988

Attest:

DONALD J. QUIGG

Attesting Officer

Commissioner of Patents and Trademarks